June 18, 1957 G. ALFIERI 2,795,963
ELECTROPNEUMATIC INSTALLATION FOR CONTROLLING THE
CHANGE-SPEED GEAR IN AUTOMOTIVE VEHICLES
Filed Jan. 25, 1954 5 Sheets-Sheet 5

INVENTOR.
GUISEPPE ALFIERI
BY
ATTORNEY

United States Patent Office 2,795,963
Patented June 18, 1957

2,795,963
ELECTROPNEUMATIC INSTALLATION FOR CONTROLLING THE CHANGE-SPEED GEAR IN AUTOMOTIVE VEHICLES

Giuseppe Alfieri, Milan, Italy, assignor to Fabbrica Italiana Magneti Marelli, Milan, Italy Application January 25, 1954, Serial No. 405,923

Claims priority, application Italy January 26, 1953

9 Claims. (Cl. 74—334)

The present invention relates generally to the control of the change-speed gear transmission of an automotive vehicle, and is particularly directed to an electro-pneumatic device for that purpose which is operable from a location which is remote with respect to the transmission.

An object of this invention is to provide an electro-pneumatic device including servo-control members situated on, or adjacent to, the automotive transmission for actuating the synchronizing members of the latter to change the drive condition in response to the actuation of associated electromagnetically operated valves, which are controlled by electric circuits established by a remotely located selector.

Another object of the invention is to provide an electro-pneumatic device of the described character, wherein the selector is movable through various positions corresponding to related drive conditions of the transmission, and means are provided to prevent the actuation of the electro-magnetically operated valve in response to manipulation of the selector, unless the clutch of the motor vehicle has been disengaged.

A further object is to provide an electro-pneumatic device of the described character, wherein actuation of the electro-magnetically operated valve during manipulation of the selector is prevented, thereby to avoid false shifting of the transmission.

Still another object is to provide a safety device associated with the selector and normally preventing the manipulation of the latter to the position corresponding to the reverse condition of the transmission, so that the transmission can be lifted into reverse only after the safety device has been released.

A still further object of the invention is to provide an electro-pneumatic device of the above described character, wherein the servo-members and the associated valves for establishing the several forward speeds of the transmission are all embodied in a single housing adapted to form a cover of the casing of the transmission.

The above, and other objects, features and advantages of the invention, will be apparent in the following detailed description of an illustrative embodiment thereof, particularly when the detailed description is read in connection with the accompanying drawings forming a part hereof and wherein.

Figure 1:
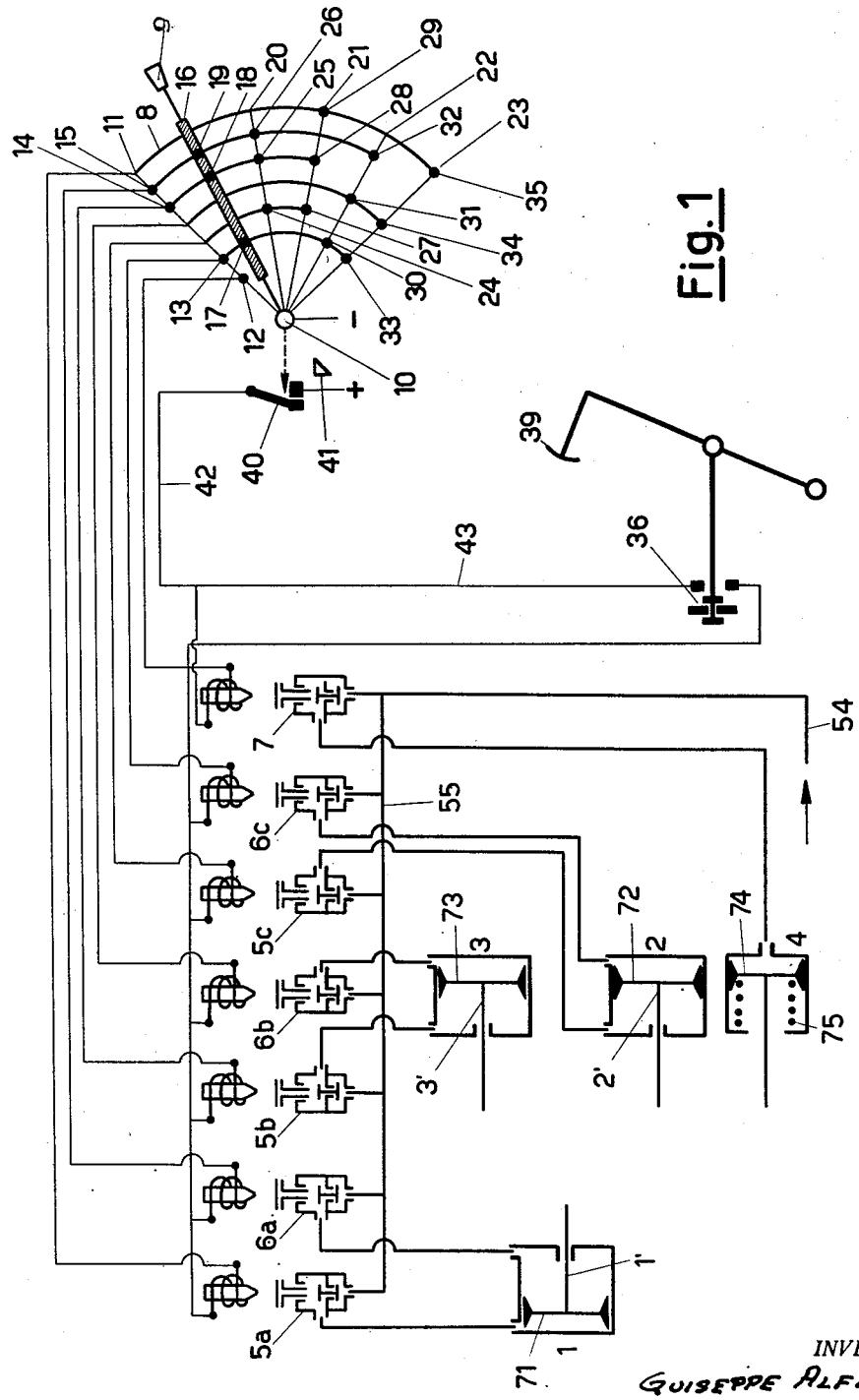
Fig. 1 is a schematic and wiring diagram of an electro-pneumatic device embodying the present invention for controlling the change-speed gear transmission of an automatic vehicle.

Referring to the drawings in detail, and initially to Fig. 1 thereof, it will be seen that the illustrated electro-pneumatic device for controlling the change-speed gear transmission of an automotive vehicle in accordance with this invention includes three cylinders 1, 2 and 3, respectively having plungers or pistons 71, 72 and 73 reciprocable therein. The cylinders 1, 2, and 3 are arranged to admit compressed air to the interior thereof at one or the other of the sides of the related pistons, thereby to stroke the latter in one direction or the other. The pistons 71, 72 and 73 are intended to control or actuate related synchronizing members of an associated change-speed gear transmission (not shown), and the forward drive condition of the latter will depend upon the directions in which the pistons 71, 72 and 73 are displaced, and the corresponding displacements of the related synchronizing members.

The admission of compressed air to the interiors of the cylinders 1, 2 and 3 at one or the other of the sides of the related pistons is controlled by electro-magnetically operated valves 5a and 6a, 5b and 6b, and 5c and 6c, respectively. The compressed air is supplied through an inlet conduit 54 which communicates with a manifold 55 opening into the several above identified valves. The two valves associated with each of the cylinders 1, 2 and 3 are alternately operated, so that, for example, with reference to the cylinder 1, when the valve 5a admits compressed air from the manifold 55 into the related end of the cylinder the valve 6a will communicate the related end of the cylinder 1 with the atmosphere, and the plunger or piston 71 will be displaced to the right, as viewed in Fig. 1. On the other hand, when the valve 6a communicates the related end of cylinder 1 with the manifold 55, the valve 5a will communicate the related end of the cylinder with the atmosphere, thereby to effect displacement of the piston 71 toward the left, as viewed in the drawing. Since the cylinders 1, 2 and 3 are double-acting, the related pistons will remain positioned at one or the other of the ends of the cylinders until the associated electro-magnetically operated valves are again actuated.

The shifting of an associated change-speed gear transmission into its reverse condition is achieved when the pistons 71, 72 and 73 are arranged to provide the neutral condition of the transmission, and compressed air is then supplied to an additional cylinder 4, having a piston 74 reciprocable therein for actuating a related synchronizing member of the associated transmission. It will be seen that compressed air is admitted to the cylinder 4 only at one side of the piston 74 therein, for displacing the piston toward the left, as viewed in Fig. 1, and that the return movement of the piston 74 is effected by a compression spring 75 acting on the piston within the cylinder 4. An electro-magnetically operated valve 7 is interposed between the manifold 55 carrying compressed air and the inlet for compressed air of the cylinder 4. Thus, the valve 7 either communicates the cylinder 4 with the manifold 5, or with the atmosphere.

The electro-magnetically operated valves 5a and 6a, 5b and 6b, 5c and 6c, and 7 are all controlled by electric circuits including a selector, which is generally identified by the reference numeral 8. The selector 8 includes a movable contact, in the form of an elongated bar 9, mounted, at one end, on a pivot 10 for swinging about the latter, and also movable in a plane normal to such swinging. The movable contact 9 is manually swingable about the pivot 10 through a plurality of angularly spaced apart positions indicated at 11, 16, 20, 21, 22 and 23, which respectively correspond to the reverse, neutral, and first, second, third and fourth forward speeds of the associated transmission. A source of electric current, indicated at 41, is connected, at one side, to the movable contact 9 and, at its other side, to a conductor 42 having a safety switch 40 interposed therein for a purpose hereinafter described in detail. The coils of the several electro-magnetically operated valves are connected, at one side, to respective fixed contacts which are disposed along radial lines corresponding to the positions 11, 16, 20, 21, 22 and 23 of the movable contact 9, while the other side of the coil of valve 7 is connected directly to the conductor 42 and the other side of the coils of the pairs of valves associated with the cylinders 1, 2 and 3 are connected in parallel to a conductor 43 which is connected to the conductor 42 and has a safety switch 36 interposed therein, for a purpose hereinafter indicated in detail.

As seen in Fig. 1, the coil of valve 7 is connected to a single contact 12 located on the radial line extending from the pivot 10 through the position 11. The coil of valve 6c is connected to a conducting segment which is concentric with the pivot 10 and includes contacts 13, 17, 30 and 33 arranged along the radial lines extending through the positions 11, 16, 22 and 23, respectively. The coil of valve 5c is also connected to a segment concentric with the pivot 10 and having contacts 24 and 27 thereon at locations on the radial lines extending through the positions 20 and 21, respectively. The coil of valve 6b is connected to a segment which is concentric with the pivot 10 and includes contacts 31 and 34 disposed on the radial lines extending through the positions 22 and 23, respectively. The coil of valve 5b is connected to a segment concentric with the pivot 10 and including contacts 14, 18, 25 and 28 disposed on the radial lines extending through the positions 11, 16, 20 and 21, respectively. The coil of valve 6a is connected to a segment concentric with the pivot 10 and including contacts 15, 19, 26 and 32 located on the radial lines extending through the positions 11, 16, 20 and 22, respectivley. Finally, the coil of valve 5a is connected to a segment concentric with pivot 10 and including contacts 29 and 35 disposed on the radial lines extending through the positions 21 and 23, respectively.

From the foregoing, and assuming that the switches 36 and 40 are closed, it is apparent that, when the movable contact 9 is disposed at the position 11, the coils of valves 6a, 5b, 6c and 7 will all be energized to effect the manipulation of the corresponding pistons to the positions establishing the reverse condition of the associated transmission; when the movable contact is in the position 16, the coils of valves 6a, 5b, and 6c will all be energized to effect the displacement of the corresponding pistons to the positions establishing the neutral condition of the transmission; when the movable contact is in the position 20; the coils of valves 6a, 5b, and 5c will be energized to effect the displacement of the corresponding pistons to the positions establishing the first forward speed of the associated transmission; when the movable contact is in the position 21, the coils of valves 5a, 5b and 5c will all be energized to effect the displacement of the related pistons to the positions corresponding to the second forward speed of the transmission; when the movable contact is in the position 22, the coils of valves 6a, 6b and 6c will all be energized, to effect the displacement of the related pistons to the positions corresponding to the third forward speed of the associated transmission and when the movable contact is in the position 23, the coils of valves 5a, 6b and 6c will all be energized to effect the displacement of the related pistons to the positions corresponding to the fourth forward speed of the associated transmission.

In order to prevent the shifting of the associated transmission, which results from the actuation of the electromagnetically operated valves, at any time when the friction clutch associated with the transmission is engaged, the safety switch 36 is arranged for actuation by the clutch pedal 39. Thus, when the pedal 39 is in the position thereof corresponding to engagement of the clutch, the switch 36 is opened, as shown in Fig. 1, thereby interrupting the circuits to the coils of all of the valves servicing the cylinders 1, 2 and 3. However, when the pedal 39 is depressed in order to disengage the clutch, the safety switch 36 is closed to complete that portion of the circuit represented by the conductor 43. Thus, even if the movable contact 9 of the selector 8 is manipulated prior to the disengagement of the clutch, no shifting of the transmission will occur until the clutch is disengaged, and the possibility of stripping the gears of the transmission is thereby avoided.

Figure 5:
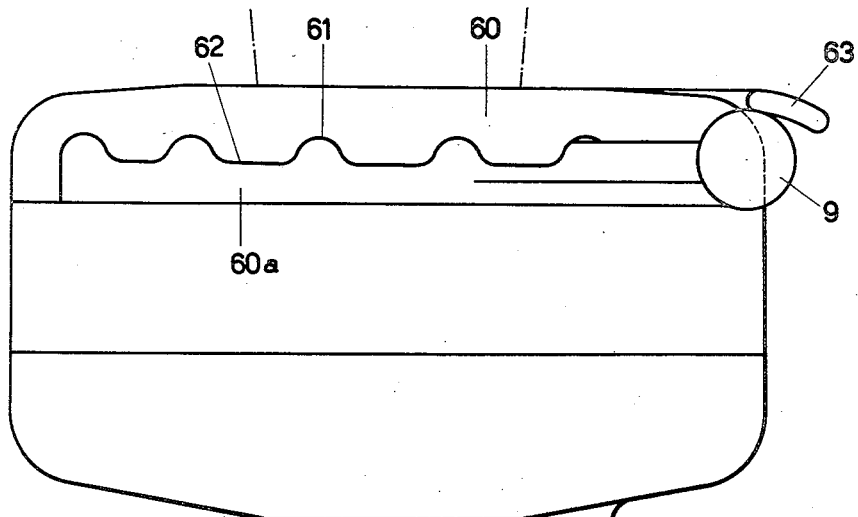
Fig. 5 is a front elevational view of a selector included in the device embodying this invention.

Further, in order to prevent false shifting of the transmission, for example, when the movable contact 9 is disposed anywhere between the positions 11, 16, 20, 21, 22 and 23, the safety switch 40 in conductor 42 is arranged for actuation by the movable contact 9 and is opened when the latter is disposed anywhere between or intermediate the above identified positions. For example, as previously mentioned, the movable contact 9 is swingable, not only about the pivot 10, but also about an axis normal to the pivot 10, and the safety switch 40 is opened and closed in response to the swinging of the movable contact about said axis normal to the pivot 10. Referring to Fig. 5 of the drawings, it will be seen that the selector 8 is enclosed within a housing 60 having a slot 60a in the side thereof through which an extension of the movable contact 9 radially projects. Along one edge of the slot 60a there is a series of notches 61 located to receive the extension of the movable contact 9 in each of the established positions 11, 16, 20, 21, 22 and 23 of the latter. Further, suitable resilient means (not shown) are provided for urging the movable contact 9 towards the side edge of the slot 60a having the notches 61 therein. The switch 40 and its connection to the movable contact 9 are arranged so that the safety switch 40 will be closed whenever the extension of the movable contact is disposed in any one of the notches 61. However, when the movable contact is being displaced from one to the other of its established positions, the extension of the movable contact will ride over the portions 62 of the edge of the slot 60a intermediate the notches 61, and will be deflected or displaced downwardly by the edge portion 62. The switch 40 is arranged so that it will be opened in response to the downward displacement of the movable contact 9 resulting from the engagement of the extension of the latter by the edge portions 62 of slot 60a.

In describing the operations of the clutch pedal operated safety switch 36, it was mentioned that the switch 36 was defective to control the closing of the circuits to only the valves associated with the cylinders 1, 2 and 3. Thus, the switch 36 has no effect upon the energization of the coils of the valve 7 associated with the reversing cylinder 4. This arrangement is necessary since the piston 74 in the cylinder 4 is actuated in only one direction by compressed air, and its return is effected by the spring 75. Thus, the piston 74 will remain in its reversed establishing position, against the force of the spring 75, only so long as the coil of valve 7 continues to be energized for supplying compressed air to the cylinder 4. By the arrangement described above, the positioning of the movable contact 9 at the position 11, which corresponds to the reversed position of the transmission, will continue to energize the valve 7, even after the pressure on the pedal 39 has been released in order to permit engagement of the clutch for rearward travel.

Figure 6:
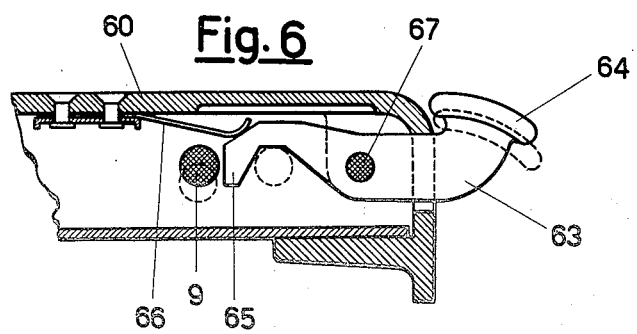
Fig. 6 is a fragmentary, sectional view showing a detail of the selector of Fig. 5.

In order to prevent inadvertent or accidental movement of the movable contact 9 of the selector 8 into its reverse position 11, a releasable, mechanical safety device is embodied in the selector (Fig. 6) and prevents the movement of the contact 9 to the position 11 unless such mechanical safety device is manually released. Referring to Fig. 6, it will be seen that the above mentioned mechanical safety device includes a rockable latch 63 which is pivoted within the housing 60, as at 67, and has a handle 64, at one end, extending out of the selector housing. At its other end, the latch 63 has a nose 65 which normally projects into the path of travel of the movable contact 9 in moving from the neutral position 16 into the reverse position 11. A spring 66 acts on the latch 63 normally maintain the latter in a position, shown in full lines on Fig. 6, wherein the nose 65 projects into the path of travel of the contact 9. However, when the handle 64 is manually depressed, for example, to the broken line position of Fig. 6, the nose 65 of the latch is elevated, to permit the movement thereunder of the contact 9 into the reverse position 11.

Figure 2:
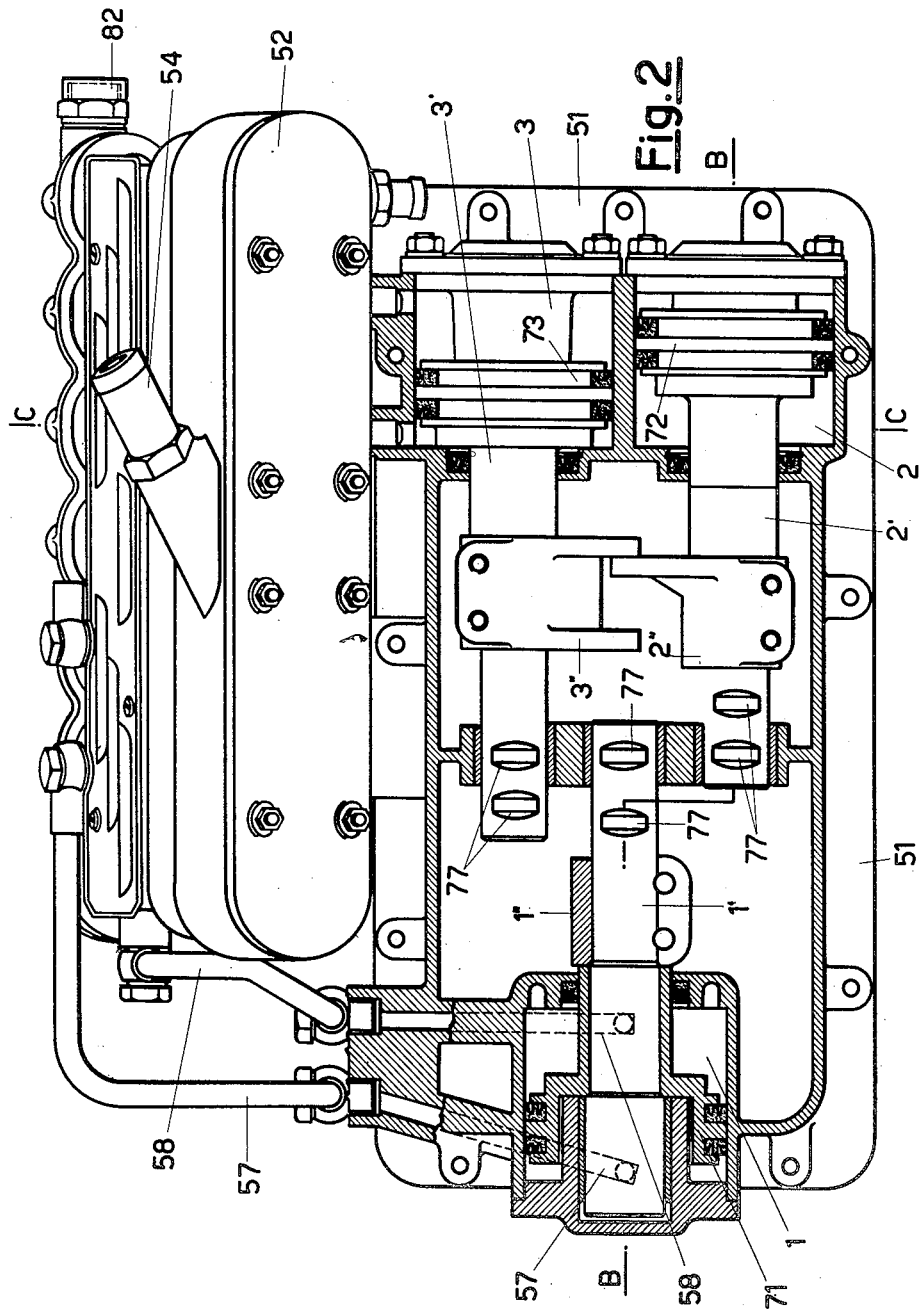
Fig. 2 is a longitudinal, sectional view of an assembly of servo-members and associated valves forming a part of the device embodying this invention, and taken along the line A—A of Fig. 3.
Figure 3:
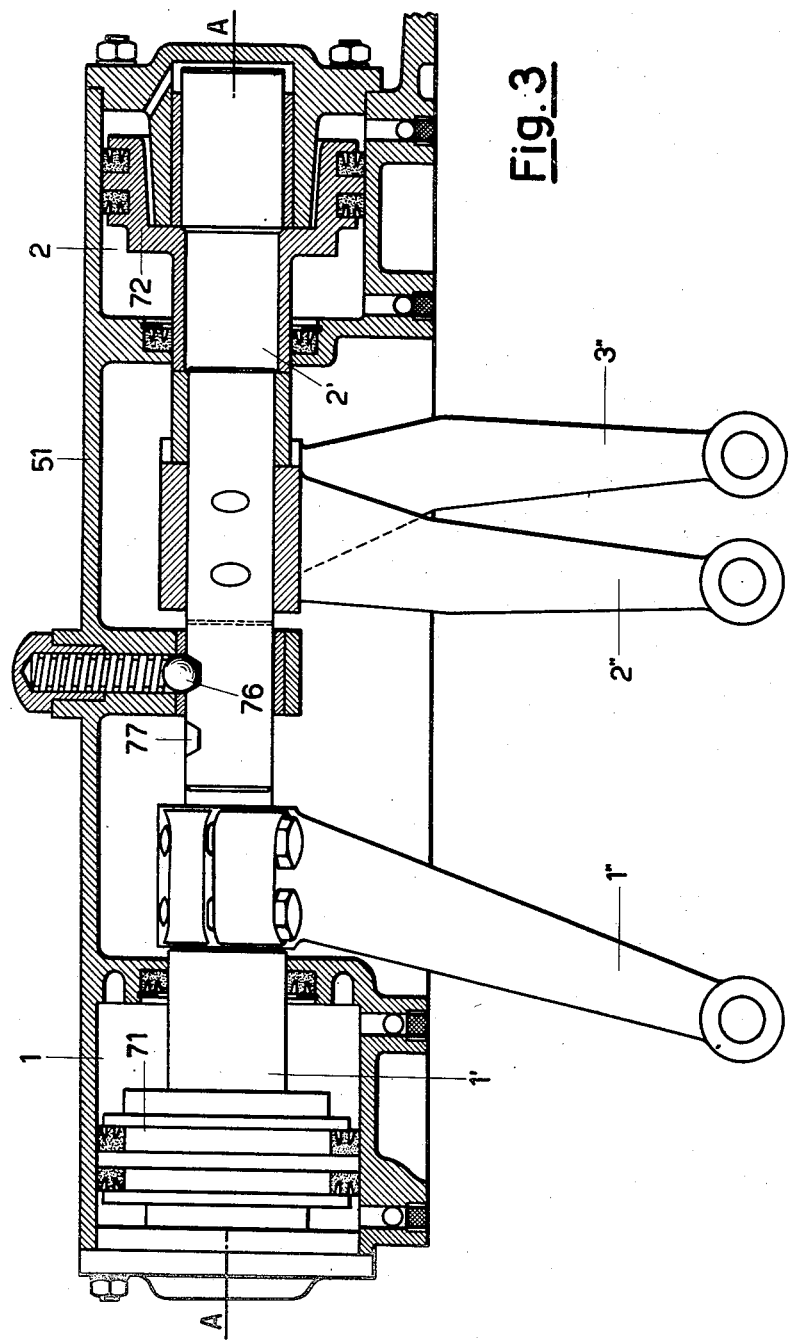
Fig. 3 is a longitudinal sectional view taken along the line B—B of Fig. 2.
Figure 4:
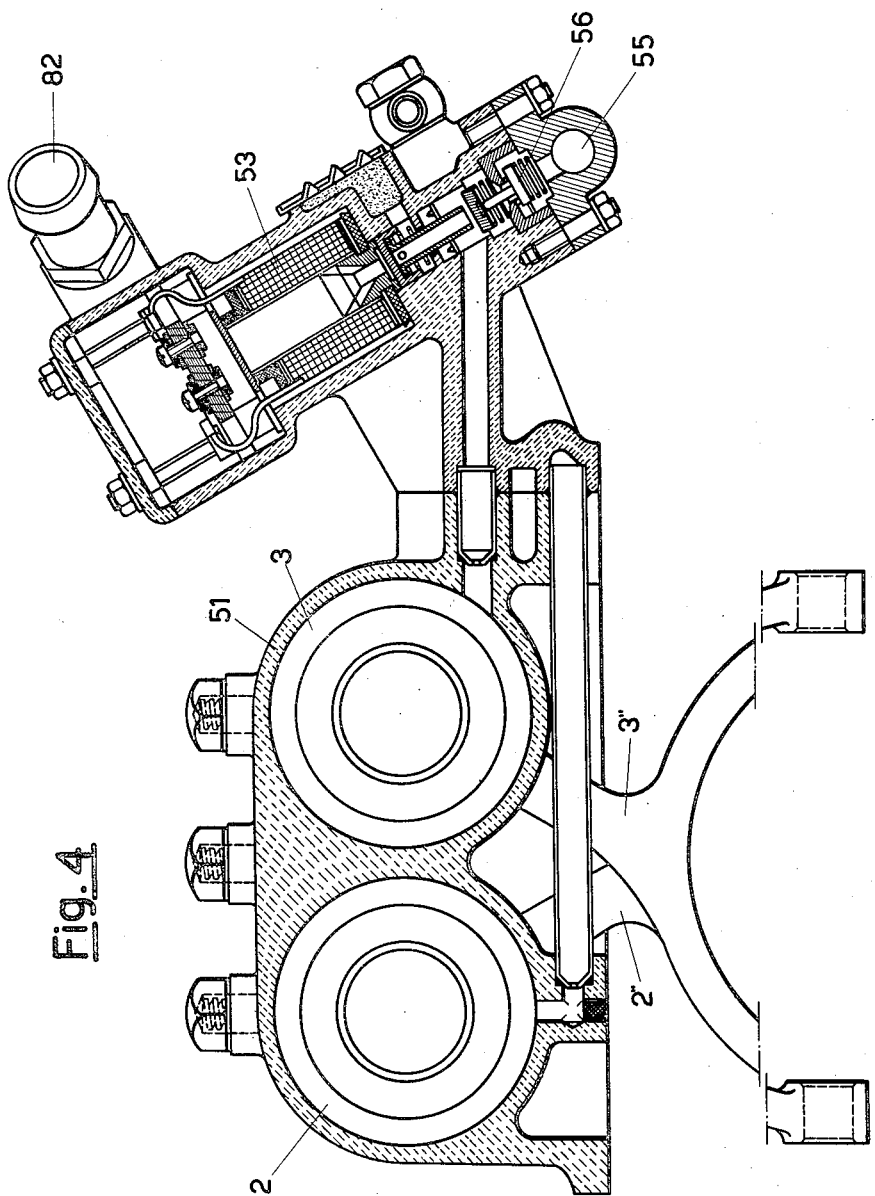
Fig. 4 is a transverse, sectional view taken along the line C—C of Fig. 2.

Referring to Figs. 2, 3 and 4, wherein a structural embodiment of a portion of a device constructed in accordance with this invention is illustrated, it will be seen that the cylinders 1, 2 and 3 are embodied in a single housing 51 which is adapted to form the cover of the casing for an associated change speed gear transmission. The piston 71, 72 and 73 within the cylinders 1, 2 and 3 have rods 1', 2' and 3', respectively, extending therefrom to actuate arms 1'', 2'' and 3'', respectively, which in turn control the related synchronizing members of the change-speed gear transmission. Preferably, as seen in Fig. 3, a spring urged detent ball 76 is associated with each of the rods 1', 2' and 3', and is receivable in one or the other of two longitudinally spaced apart sockets 77 formed in such rods, so that the spring urged detent ball 76 will yieldably retain the related piston at one or the other of the end positions within the associated cylinder.

Mounted on the cover forming housing 51 and forming a unit with the latter is an assembly 52 comprising the electro-magnetically operated valves which control the operation of the cylinders 1, 2 and 3 and of the cylinder 4 for controlling the reverse condition. However, it is to be noted that the cylinder 4 is not inclined within the housing 51 and is separately mounted at a location spaced from the housing 51. The assembly 52 has an inlet fitting 82 (Figs. 2 and 4), through which all of the electrical conductors or cables for the coil 53 (Fig. 4) of the several valves extend. As seen in Fig. 2, the inlet 54 for compressed air is provided on the assembly 52 and communicates, within the latter, with the internal manifold 55 opening into the valve containing chambers 56 (Fig. 4) of the several electromagnetically operated valves. As seen in Fig. 2, conduits 57 and 58 extend from the electro valves associated with the cylinder 1 and open into the latter at the opposite sides of the piston 71. Similar conduits extend from the other electromagnetically operated valves of the assembly 52 to the related cylinders 2 and 3 within the housing 51 and to the separate cylinder 4, but such conduits have been omitted from the drawing for the purpose of simplicity.

Although an illustrative embodiment of the invention has been described in detail and shown in the accompanying drawings, it is to be understood that the invention is not limited to that particular embodiment, and that various changes and modifications may be effected therein without departing from the scope or spirit of the invention as defined in the appended claims.

What I claim is:

1. An electro-pneumatic device for controlling the change-speed gear transmission of an automotive vehicle; said device comprising a plurality of cylinders having plungers reciprocable therein for actuating the synchronizers of an associated transmission, means including pairs of electro-magnetically operated valves for controlling the admission of a fluid under pressure to said cylinders at the opposite sides of said plungers in the latter, electric circuit means for controlling the operation of said valves including a remote, manually actuable selector for determining the positions of said valves, means in said circuit means for preventing any change in the positions of said valves during the engagement of the clutch of the associated automotive vehicle, so that the change-speed gear transmission can be shifted only when the clutch is disengaged, an additional cylinder having a plunger reciprocable therein for shifting an associated change-speed gear transmission into reverse, a single electro-magnetically operated valve for controlling the admission of a fluid under pressure into said additional cylinder at one side of the related plunger to move the latter in the direction effecting reversal of the change-speed gear transmission, spring means for effecting the movement of the plunger in said additional cylinder in the opposite direction, and an electric circuit for energizing said single electro-magnetically operated valve and which is controlled directly by said selector.

2. An electro-pneumatic device according to claim 1; further comprising releasable safety means normally preventing the shifting of said selector to the position thereof for energizing said single valve so that the associated change-speed gear transmission can be shifted into reverse only after the release of said safety means.

3. An electro-pneumatic device according to claim 1; wherein said selector includes a movable contact mounted on a pivot for angular displacement about the latter, and fixed contacts interposed in the electric circuits controlling said pairs of valves and said single valve and arranged along various radial lines extending from said pivot and corresponding to various conditions of an associated change-speed gear transmission, said movable contact being also interposed in said circuits so that, as said movable contact is selectively aligned with said radial lines it engages the related fixed contacts to close at least portions of said circuits.

4. An electro-pneumatic device according to claim 3; wherein said movable contact is also swingable about an axis normal to said pivot, a safety switch interposed in all of said circuits and operable by swinging of said movable contact about said axis normal to the pivot, and means effecting swinging of said movable contact about said axis to open said safety switch during swinging of said movable contact about said pivot between positions aligned with said radial lines so that any changes in the positions of said valves and shifting of the change-speed gear transmission are then prevented.

5. An electro-pneumatic device according to claim 4; wherein said means effecting swinging of the movable contact about the axis normal to the pivot includes a housing within which said movable contact is swingable and having a slot through which an extension of said movable contact extends, said slot having notches at one side in positions radially aligned with said radial lines to receive said extension and then permit swinging of said movable contact about said axis in the direction closing said safety switch, and spring means urging said movable contact in said direction closing the safety switch, the engagement of said extension with the portions of said slot between said notches causing swinging of said movable contact about said axis in the direction opening said safety switch.

6. An electro-pneumatic device according to claim 5; further comprising a single housing embodying said plurality of cylinders and the related pairs of electro-magnetically operated valves, the last mentioned housing being adapted to form a cover for the casing of an associated change-speed gear transmission.

7. An electro-pneumatic device according to claim 6; further comprising an auxiliary housing containing said additional cylinder and the related single valve and separate from said housing containing said plurality of cylinders and pairs of valves.

8. An electro-pneumatic device according to claim 1; wherein the last mentioned means includes a safety switch interposed only in said circuit means for controlling the operation of said pairs of valves, and an actuator for said safety switch adapted to be operated from the clutch pedal of an associated automotive vehicle so that said safety switch is open during engagement of the clutch and is closed by disengaging movement of the clutch pedal.

9. An electro-pneumatic device for controlling the change-speed gear transmission of an automotive vehicle; said device comprising a plurality of cylinders having plungers reciprocable therein for actuating the synchronizers of an associated transmission, means including pairs of electro-magnetically operated valves for controlling the admission of a fluid under pressure to said cylinders at the opposite sides of said plungers in the latter, electric circuit means for controlling the operation of said valves, a driver actuable electric selector situated near the driver and shiftable through a plurality of positions corresponding to various related ratios of the associated change-speed gear transmission, said electric selector having sets of contacts interposed in said electric circuit means and which are selectively engaged at said positions to exclusively select the arrangements of said circuit means and thereby directly determine the operation of said valves and, thus, the ratio of the associated change-speed gear transmission, safety means in said electric circuit means preventing any change in the positions of said valve during the engagement of the clutch of the associated automotive vehicle so that the change-speed gear transmission can be shifted only when the clutch is disengaged, and additional safety means in said electric circuit means preventing any change in the positions of said valves during the displacement of said selector between said positions of the latter, thereby to avoid false shifting of the change-speed gear transmission.

References Cited in the file of this patent

UNITED STATES PATENTS

| | | |
|---|---|---|
| 1,233,088 | Maegley | July 10, 1917 |
| 1,610,132 | Guernsey | Dec. 7, 1926 |
| 1,966,865 | Linsley | July 17, 1934 |
| 1,992,957 | Maedel | Mar. 5, 1935 |
| 2,012,398 | McKenzie | Aug. 27, 1935 |
| 2,035,678 | Swift | Mar. 31, 1936 |
| 2,110,994 | Linsley | Mar. 15, 1938 |
| 2,121,157 | Lempereur et al. | June 21, 1938 |
| 2,185,730 | Griswold | Jan. 2, 1940 |